July 12, 1960 H. WALD 2,944,422
ELECTRIC MEASURING DEVICE FOR MIXED AIR TEMPERATURE
Filed Oct. 2, 1957

*INVENTOR.*
BY Herman Wald

United States Patent Office 2,944,422
Patented July 12, 1960

2,944,422

ELECTRIC MEASURING DEVICE FOR MIXED AIR TEMPERATURE

Herman Wald, 23—31 29th St., Astoria, N.Y.

Filed Oct. 2, 1957, Ser. No. 687,750

5 Claims. (Cl. 73—342)

This invention relates to a method and apparatus for measuring the average-temperature of air mixtures consisting of two air streams having variable quantities and temperatures, and to provide a more efficient and accurate system of this character than has heretofore been available.

In particular, it relates to a method and apparatus serving to exactly measure the true mixed air temperature of the air-mixture supplied by the outdoor and recirculated air dampers in heating or air conditioning systems. A variable condition in quantity or temperature distribution of the individual air streams may be represented by an electrical value, such as resistance, potential or other similar electrical characteristic, the resulting average value of which may be continuously measured through the elements of the circuit arrangement in accordance with the invention. The result of this measurement may then be used to effect a modulating control on the relative proportion of the air streams or on the heat supply system to suit the variable load requirement.

It is generally known that the load imposed on any fan heating-cooling system is mainly determined by the temperature conditions of the air-mixtures entering the system. Accordingly, a mixture thermostat may position the outdoor and return air dampers to maintain a constant mixed-air temperature entering the coil or may actuate a modulating controller, at the command of which the motorized face and by-pass dampers by moving in opposite direction may proportion the relative amounts of air passed through and around the coil, or it may actuate by any other means so as to maintain the desired constant discharge temperature.

Also for several other control applications it would be preferable to apply an air-mixture measuring method, however, due to its unaccurate operating characteristic and relatively low dependability is not too often used in practice.

The disadvantages of the prior art measuring apparatus in which a thermostat is located in the mixture of outdoor and return air line in the air stratification condition. In fact, it is very difficult to find a representative location of the thermostat for measuring the average temperature of the mixture. Moreover, the difficulty arises from the fact that as the dampers close, the condition of the stratification changes from position to position, therefore we face a steady variable condition of the air stratification. Consequently the mixed air control generally cannot be used successfully.

It is therefore the general object of the invention to provide an exact measuring device for the temperature of the air mixtures and which is based on an electric circuit including two temperature responsive resistance elements in series with proportionate lengths to be exposed to the respective air currents discharging from the corresponding damper system.

It is also an object of the invention to adapt these resistance elements with slide-contact arms in order to proportion their lengths in accordance with the volume distribution of the corresponding air currents.

It is an additional object of the invention to provide interlocking means between these slide-contact arms and corresponding damper system for the purpose of securing a simultaneous displacement of both in a predetermined relative proportion along the whole angular run of the dampers.

It is a further object of the invention to adopt both reversed operating damper systems in such a manner as to effect a linear variation of the respective free areas along the entire angular run, as required by the principles herein involved.

Another additional object of the invention consists of providing an electric bridge circuit to measure the variation of the temperature responsive resistances in strict dependence with the average temperature changes of the air mixtures in producing a proportionate magnitude of unbalance potential to be used for any desired control application.

It is a specific object of the invention to provide a complete measuring device in which the unbalance potential is detected by an electronic or other relay system to carry out the desired control.

Finally it is still a further object of the invention to adopt an exact measuring device for the case when the sum of the varying volumes of the corresponding air streams is not constant. This is mainly accomplished by further adapting two potentiometer like resistor elements of non-responsive character to work in conjunction with the temperature responsive resistance elements, and forming additional elements in a corresponding bridge circuit.

Other objectives and advantages of the apparatus, etc., will be apparent from the following description and the drawings hereto appended.

The attainment of these objectives with the overcoming of the prior art apparatus is accomplished by a relatively simple apparatus of this invention to be described hereinafter and illustrated in preferred embodiments in the accompanying drawings wherein the same reference characters in the different figures designate the same elements and wherein Figure 1 is a diagrammatic representation of an electric circuit arrangement showing the basic principle of the invention.

Figure 2 represents a modified circuit diagram of that shown in Figure 1, wherein the sliding contact arms are indicated.

Figure 3 indicates the characteristic curves of the average value of the temperature responsive resistances under variable volume and temperature conditions of the respective air streams.

The basic principle of operation of this invention will be explained fully with reference to Figures 1, 2 and 3.

Figure 1:
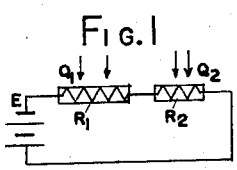

Referring now particularly to Figure 1, the electric circuit illustrated therein comprises a direct current source E, and two temperature responsive resistance elements $R_1$ and $R_2$ in series. Let it be assumed that the relative proportion of the magnitudes (or lengths) of said temp. responsive resistance elements is exactly identical with the relative proportion of the quantities of two air streams $Q_1$ and $Q_2$, whose varying temperature is to be measured. If under this setting condition said resistance elements are exposed to the respective air currents, it is clear that their electrical resistive values in ohms will become proportional to the respective temperatures of the air streams to which they are subjected.

Now we have two air streams of different quantity and temperature, the resultant average temperature of the mixture may be determined by the following formula:

$$T_m = \frac{(T_1 \times Q_1) + (T_2 \times Q_2)}{Q_1 + Q_2} \qquad (1)$$

where Q and T denote the quantity and temperature of the respective air streams. As it is also assumed that in this particular case the sum of the two air quantities under any variable temperature conditions is considered constant, we may set $Q_1 + Q_2 = 1$, and therefore the average mixed-air temperature may be expressed in terms of percentage, as follows:

$$T_m = (T_1 \times X) + (T_2 \times (1-X)) \qquad (2)$$

where X is the percentage distribution between said air quantities.

Owing to the proportionality characteristic of the temperature responsive electrical resistances with respect to the temperature, we may obtain the following expression:

$$R_m = (R_1 \times X) + (R_2 \times (1-X)) \qquad (3)$$

where $R_m$ denotes the resultant average resistance of the two resistances in series, since by virtue of our initial assumption the proportion or percentage distribution of the resistance-lengths are identical with the proportion of the respective air-volumes. As a conclusion, the value of $R_m$, under any variable temperature condition, will always be exactly proportional to the prevailing true and accurate mixed-air temperature which is so measured in terms of the electrical resistance values.

The intensity of current flowing at any time in this circuit is given by:

$$E/R_m = i \qquad (4)$$

the variation of which is exactly proportional to the corresponding variation of the accurate mixed-air temperatures to be measured. Consequently the variation of the corresponding current intensity will continuously be transmitted to a control system to actuate the desired control of the system.

A practical example may illustrate the accuracy of the above operating condition. $T_1 = 32°$ F., $X = 25\%$, $T_2 = 75°$ F., $1-X = 75\%$. Hence the mixed-air temperature is $32 \times 25\% + 75 \times 75\% = 64°$ F. The equivalent electrical resistance measurement is given by the following characteristical expression:

$$R_m = R_0(1+at) \qquad (5)$$

where $a$ = temp. coef = 0.01, and $R_0$ is assumed to be 100 ohms at 0° F., and unit length. If the 25% length of the resistance wire is exposed to the air stream of 32° F., its final value will become:

$$100(1+0.01 \times 32) = 132 \text{ ohms} \times 25\% = 33 \text{ ohms}$$

Whereas the 75% length of the resistance wire is exposed to the air stream of 75° F., its final value becomes:

$$100(1+0.01 \times 75) = 175 \text{ ohms} \times 75\% = 131 \text{ ohms}$$

which makes a total value of both resistances in series:

$$131 + 33 = 164 \text{ ohms} = R_m$$

According to the Expression 5, this result corresponds to a mixed-air temperature:

"$100(1+0.01 \times 64°$ F.$) = 164$ ohms"

of 64° F. which is in full agreement with the above found value.

Figure 2:
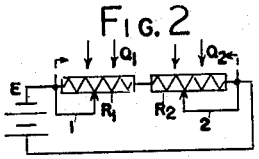

Referring now to Figure 2, there is shown the circuit diagram with both resistance elements $R_1$ and $R_2$ being adopted with sliding contact arms 1 and 2, respectively, which operate like a potentiometer along the entire length of the resistance wire, whereby the free end short circuited length of each of the resistances is determined by the position of the slider. It is preferably arranged by some mechanical means to operate both sliders 1 and 2, simultaneously but in opposite direction with respect to each other and in such a manner that when one is completely short circuited, the other is entirely open, thereby to maintain a constant resultant length of both resistances $R_1$ and $R_2$ in series irrespective of the position of the sliders.

This modified method of the invention shown on Figure 2 has the intention to be applied to heating and air conditioning systems using fresh and return air dampers to vary the proportion of the individual air streams with practically constant total volume under any position of the cooperating damper systems. Now let it be assumed that the relative proportion of the quantities of the two air streams, whose varying mixed-air temperature is to be measured, may vary linearly by maintaining a constant total volume and also the relative proportion of the lengths of said temp. responsive resistance elements in series are made by a corresponding displacement of the cooperating sliders to be in strict accordance with the relative proportion of said air quantities under any position of the cooperating damper systems. With this strict operating method we establish a completely equivalent condition with that described in connection with Figure 1, and the exact validity of the above Equations 1 to 5 may invariably be applied to this case. As a conclusion, the exact measurement of the mixed-air temperature is accomplished along the entire angular run of the cooperating dampers, provided the above required operating conditions are satisfied.

Figure 3:
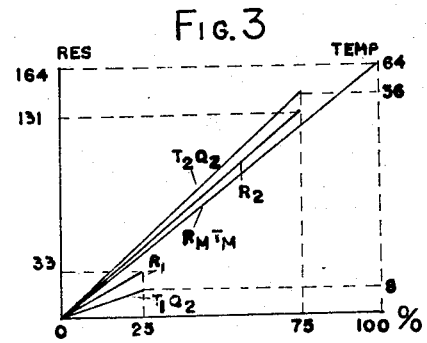

In Figure 3, the characteristic lines $(T_1-T_2)-(R_1-R_2)$ represent the temperature-resistance plotted vs. volume-length of resistance. The ordinates show the resistance and temperature values, respectively. As previously explained, a linear relationship is established between volume and resistance length, hence to any unit volume a determined unit-length of resistance wire is coordinated. The resistance of the thermo-responsive elements having a positive temperature coefficient increases with rise in temperature and is well known in the present art. The lines $R_1$, $R_2$ denote the rise of the resistance value under various temperatures of the respective air streams, whereas the lines $T_1Q_1$, $T_2Q_2$ denote the rise of this product-value under same conditions. The line $T_m$ represents the exact mixed-air temperature in combination with the resulting mean-resistance value $R_m$, as being determined by the intersection point of $T_m$ with the ordinate corresponding to 100% volume-resistance length. This is due to the fact that the sum of the air quantities $Q_1$, $Q_2$ as well as the sum of the corresponding resistance lengths, at any position of the cooperating sliders-dampers, is always constant. The indicated R and T values are taken from the foregoing example.

Figure 4:
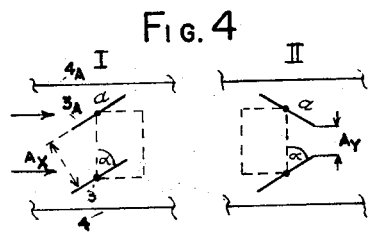
Figure 4 illustrates a damper system arrangement to produce a linear variation of the free area along the entire angular run.

Figure 4 illustrates two basic types of damper arrangements. Type I represents a parallel blade system, whereas type II works with opposed blade arrangement. With type I damper having a unit length, we find that the free area between blades equals $A_x = a \sin \alpha$, where $a$ is the width of the damper and alpha is the angle of divergence. However, with type II damper, the free area is equal with $A_y = a(1-\cos \alpha)$, and in both cases the closed position is at $\alpha = 0$ and the complete open position is at $\alpha = 90$ degrees.

The operating characteristic of the type I damper may perform a rather sinusoidal curve of the free area and in the middle position the free area is greater than half of the maximum open position since $\sin 45° = 0.7$. On the other hand the type II damper performs a reversed sinusoidal curve and in the middle position there is a considerable reduction of free area with respect to maximum open position, as $(1-\cos \alpha)$ at $45°$ equals 0.3.

However, an approximate linear variation of the free area along the whole angular run may be obtained by operating two parallel dampers 3, 3a between two fixed blades 4, 4a. The free area between the parallel blades varies according to the expression "$a \sin \alpha$," whereas the free area between the fixed and moving blade of either side behaves like a type II damper according to the relation "$2a/2(1-\cos \alpha)$," which for both sides amounts to $a(1-\cos \alpha)$. On this basis the total free area at any position of both dampers is given by:

$$A_1 = a[\sin \alpha + (1-\cos \alpha)] \qquad (6)$$

which gives at 90° position an area of $2A_1$ and in the middle position (45°) we get exactly the half area $A_1$. At the intermediate positions we get a linear variation of the free area with fairly close approximation.

Figure 6:
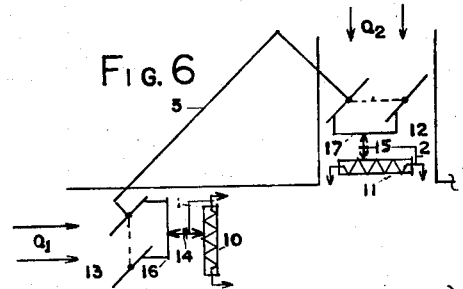
Figure 6 is a diagrammatic representation of an embodiment of the invention showing the two temperature responsive resistance elements to be exposed to the respective air currents of variable quantity and temperature with their sliding arms interlocked for simultaneous operation.

A simultaneous graduation of two damper systems of the same type is shown on Figure 6, which operate inversely i.e. opening one when closing the other with a proper arm linkage 5 assuring equal angular run for both damper systems. This type of damper system usually regulates the ratio of fresh air to return air by maintaining a constant total volume entering into the system.

Since the free area of the inversely operated damper system at any position is given by:

$$A_2 = a[\sin (90°-\alpha) + (1-\cos)(90°-\alpha)] \qquad (7)$$

therefore it exhibits the same linear variation of the free area, but in reversed phase. Hence the sum of the free areas of both simultaneously and inversely operated damper systems is as follows:

$$A_t = a (\sin \alpha + (1-\cos \alpha)$$
$$+ \sin (90°-\alpha) + (1-\cos)(90°-\alpha) \qquad (8)$$

Accordingly,
$A_1$:
at $\alpha = 0$, $A_1 = 0$
at $\alpha = 45°$, $A_1 = .7 + .3 = 1$
at $\alpha = 90°$, $A_1 = 1 + 1 = 2$ and
$A_2$:
$A_2 = 1 + 1 = 2$, $A_1 + A_2 = 2$
$A_2 = .7 + .3 = 1$, $A_1 + A_2 = 2$
$A_2 = 0 + 0 = 0$, $A_1 + A_2 = 2$ As a result the sum of both free areas at any position of the angular run is always constant.

Figure 5:
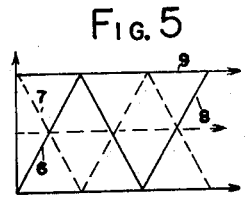
Figure 5 represents the characteristic curves of the air volume-variation through both inversely operating damper systems.

Figure 5 represents the operating characteristical curves of the simultaneous and reversed operated damper systems discharging through the respective damper systems. As we see, the lines 6 and 7 cross each other at the middle position (45°) of the angular run as shown with the dashed line 8, and the line 9 represents the constant total volume.

Referring back again to Figure 6, there is shown, by way of example, one preferred embodiment of the invention in which the temperature responsive resistance elements 10, 11 are located close to their respective damper systems 12, 13, to be exposed directly to the respective air currents so as to quickly respond to any smallest variation of the temperatures to which they are subjected. A suitable interlocking means 14 and 15 between each sliding contact arm 1 and 2 of the resistances 10 and 11 and damper linkages 16 and 17 is adopted to cause a simultaneous displacement of the sliders in opposite direction and in direct proportion with the variable position of the respective dampers along their angular run. Hence to each unit volume may correspond a determined unit length of resistance wire in order to maintain the total constant length in series independent of their relative distribution and irrespective of the varying volume distribution through both damper systems. Both terminals of the resistance wires lead to an electronic panel, as hereinafter explained, in order to carry out the desired measurement or control.

It is important to note that in case the relative proportion of the volumes of the respective air streams are fixed, and will remain invariable under any operating condition, the sliding contact arms with the above mentioned interlocking means may be omitted. Consequently, the relative proportion of the respective resistance lengths may finally be set to correspond to that of the volume distribution of the individual air streams. In this particular case, the method of operation and design is greatly simplified because of the omission of moving parts.

Figure 7:
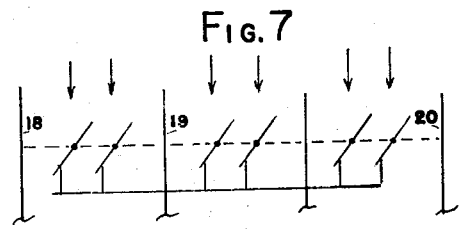
Figure 7 represents a modified arrangement of that described in Figure 6, using a plurality of damper systems.

Figure 7 represents a modified embodiment of that in Figure 6 to be employed for applications with more than one parallel damper system heretobefore described. In this case the free area may be subdivided by fixed blades 18, 19, 20 so as to operate one parallel damper system, as shown on Figure 6, between two fixed blades, thereby to establish an equivalent condition necessary to satisfy the requirement of discharging a constant total volume through a plurality of damper systems operating inversely with respect to each other.

Figures 8, 10:
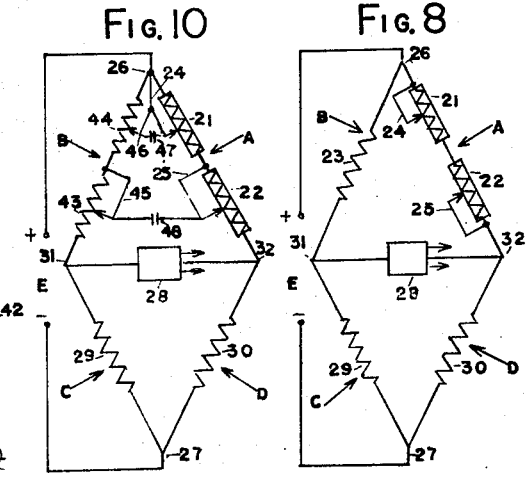
Figure 8 shows a diagram of Wheatstone bridge circuit arrangement including the two temperature responsive resistance elements to operate in accordance with the invention in forming a complete measuring or control device.
Figure 10 is a modified bridge circuit arrangement to be used in connection with the embodiment of Figure 9 in accordance with the invention.

Figure 8 is a schematic representation of a circuit diagram illustrating the mixed-air temperature measuring device in accordance with the invention. This circuit basically includes the measuring element consisting of a series combination of two temperature responsive resistance elements 21, 22 respectively, of equal value and length being connected into one arm A of a Wheatstone bridge circuit, the opposite arm B of which includes a non temperature sensitive fixed resistor 23. Both said resistance elements 21, 22 are equipped with slidable contact arms 24, 25, to short circuit any portion of said elements in order to match the relative distribution of the varying volumes as has been explained. This circuit has a suitable D.C. voltage source E connected across the junction points 26 and 27 of the arms on opposite sides of the bridge in the usual manner and designated by a — and + sign at the respective points. The arms of each side of the junctions form two shunt circuits across the proportioning electronic or other control relay 28 and each is divided by its connection to the current source E. Assuming that the resistance elements 29 and 30 of the two ratio arms C and D of the bridge are selected to be of equal fixed value with non-sensitive character, the bridge will be in eelctrical balance and no voltage drop will appear across the control relay 28 or bridge points 31, 32, when the temperature responsive resistances 21, 22 in series being exposed to the respective air currents having a standard desired mixed-air temperature and are also adjusted with their slidable contact arms to a predetermined length resulting in a total series resistance of equal value with the fixed resistor 23 located in bridge arm B. The said fixed resistor 23 can preferably be made adjustable by employing any type of sliding contact means, not shown here, in order to manually adjust the value of this resistor as may be desirable to vary accordingly the predetermined standard mixed-air temperature for which the bridge is initially balanced. This adjustment is required in accordance with the invention in case of changing the desired standard mixed-air temperature level as later explained in connection with Figure 10.

Under the assumption that both sliding contact arms 24 and 25 are positioned in the strict relative proportion with the respective volume distribution of the air streams necessary for establishing the mixed-air temperature standard to which the employed control means 28 may work, i.e. the temperature value which is desirable to maintain at the sensitive bridge arm A, any slight change in the temperature of the individual air streams will immediately be sensed by the respective sensitive resistance elements 21, 22 causing a change in its resultant series resistance. Consequently, the bridge circuit is thrown out of balance. It is immaterial whether the unbalance of the measuring circuit occurs by way of a decrease or increase in the desired mixed-air temperature level, the unbalance voltage will always be of a phase dependent upon the direction of unbalance produced by the temperature variation at the control point, and the resultant change of flow of current across the bridge is utilized, after amplification, to regulate the operation of any suitable means for the purpose of restoring the mixed-air temperature at the control point to the desired value.

Thus it is quite clear that if the actual level departs from the desired level then an unbalance exists between the voltage representative of actual level and that representative of the desired level, consequently the resultant voltage due to the change in the resultant series resistance of the elements 21, 22 is of a phase and magnitude representative of the direction and extent of unbalance.

This unbalance voltage, therefore, being applied to an electronic relay 28 produces an amplified current to flow through said relay for supplying power to a suitable control means or actuator to keep it operating until the changed mixed-air temperature and following change of the series resistances will again re-establish the bridge balance in the attempt of correcting the condition and thereby restore the desired mixed-air temperature. As was pointed out with reference to Figure 1, any change in the resultant series resistances will always be exactly proportional to the corresponding variation in the true mixed-air temperature provided a continuous linear relationship is established between the relative magnitudes of the resistances in series and the relative distribution of the volumes of the respective air streams. Thus in any new position of the respective damper systems the displacement of the contact arms must be such that the resultant series length of the resistances shall be invariably constant to hold the relative balance of the bridge under standard mixed-air temperature.

It should further be noted that there is no specific control apparatus shown on this circuit diagram, since any desired types may be used. The invention, therefore, relates to the method and arrangement for measuring the exact mixed-air temperatures rather than to the means employed for controlling the constancy of the entering mixed-air temperatures. Thus it will be understood that the described method is representative only and the circuit system is equally applicable to a motor operated damper arrangement by including a potentiometer with wiper in the bridge circuit or to any various commercial type of electric controllers operating under the action of the resulting unbalance voltage. The point is that by virtue of the new measuring device the departure of the actual value of the variable from the desired value will always result in an exact corrective change of the controlled factor or agent in an attempt to return the departed variable to the exact desired value of the entering mixed-air temperature.

Figure 9:
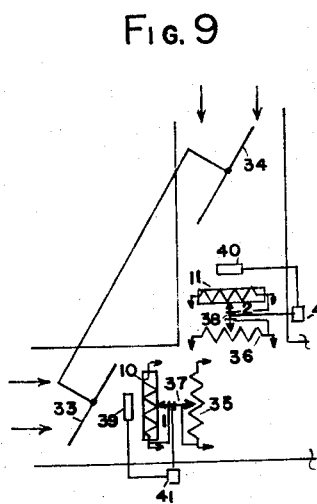
Figure 9 is a schematic illustration of another embodiment of the invention to be applied for the case of non-constant total volume of the varying air streams.

Figure 9 is a schematic representation of a modified embodiment of the invention to be applied in the general case when the sum of the quantities of the flow both individual air streams is not constant and it may rather vary from position to position. More particularly this happens when the employed damper systems exhibit a non-linear variation of the free area along the whole angular run. According to the principle of the invention an exact equivalent electrical measurement may be accomplished in this case by satisfying the necessary requirement to produce a displacement of the sliders of the respective resistances in strict proportion with the relative distribution of the varying volume of the individual air streams. Therefore some control means may be employed, as hereinafter to be described, to carry out the exact setting of the sliders.

The two temperature responsive resistance elements 10, 11 respectively, are similarly exposed to the respective air streams discharging through the dampers 33, 34 respectively, and they are further adapted with two fixed resistors 35, 36 having also slidable contact arms 37, 38 respectively. The slidable contact arms 1, 2 of the resistance elements 10, 11 respectively, are mechanically interconnected with the slidable arms 37, 38 respectively, to be positioned simultaneously, however, they are electrically isolated from each other. Two volume indicators 39, 40 respectively, are located in the respective air streams to control the movement of the motor operated sliding arms and are preferably arranged to produce a proportionate displacement with respect to the volume variation of the individual air streams. In this "proportional position" control there is established a continuous linear relation between the variable volume flow and corresponding resistance length of both cooperating resistance element pairs 10, 11 and 35, 36 respectively, since the motors 41, 42 position simultaneously both respective contact arms to short circuit a more or less portion of said resistances in order to maintain the required relative proportions with respect to the varying volumes of the individual air streams. It is further to be noted that the established proportionality must be linear over the entire operating range. The volume indicators 39, 40 may represent some of the well known commercial devices such as, "Revolving or Deflecting vane anemometer," or "Hot wire anemometer" operating in conjunction with a thermal responsive bimetallic element.

Finally it may be stated that the adjustment of dampers and resistance ratios are arranged to operate completely independent of the output of the bridge 28. It may, however, be emphasized that this invention relates solely to the method and arrangement for measuring the exact mixed-air temperature rather than to the means employed for controlling the constancy of the entering air temperature. Thus it will be understood that the unbalance potential of the bridge 28 may be used to effect a control of the temperature source to restore the desired balance.

However, it is important to note that in particular applications or in case of overheating the reversed unbalance potential of the bridge may also control the position of the dampers by a separate motorized system to increase the ventilation and thereby to re-establish the balance or the desired entering mixed-air temperature by setting the resistance ratios as a consequence of the changed damper position.

Figure 10 is a schematic representation of an operating circuit diagram as applied to the embodiment described under Figure 9. In the description of this circuit diagram reference is made to the similar diagram and circuit arrangement shown on Figure 8 which may be applied also to this circuit diagram. Therefore parts of the arrangement of Figure 10 being similar to that of the mentioned Figure 8, are not described in detail although like parts have been indicated by like reference numbers.

The basic characteristical difference between said both Wheatstone bridge circuit arrangements consists mainly of further adapting two fixed resistors 43, 44 with slidable contact arms 45, 46 respectively, connected in series in bridge arm B. The slidable arms 45, 46 operate simultaneously with the arms 24, 25 as has been previously explained. This modified arrangement is made by reason of the fact that by changing the total volume level of both individual air streams, the total series resistance of the fixed resistors 43, 44 must change compensatorily by displacing their slidable arms to correspond to the changed relative distribution of the air streams and to the prevailing total volume level. As a result, the balance of the bridge is restored under standard mixed-air conditions and irrespective of the varying total volume level.

The same identical operating condition is established for the temperature responsive resistance elements 21, 22 in series referring to the positioning of the respective sliders, therefore they are mechanically interconnected to allow the simultaneous displacements, however, they are isolated electrically at 47—48 from each other as required by the correct functioning of the circuit.

It is quite clear that, in this general case, the exact measurement of the true mixed-air temperature is accomplished, since a continuous linear relationship between the relative magnitudes of the individual resistances in series and the relative distribution of the volumes of the respective air streams is completely secured by the movements of the sliders being controlled by a volume indicator of any type in strict accordance with the variation of the individual volumes and their total value.

It may finally be noted that in case the volumes of the individual air streams are fixed and their total volumes remain constant under any operating condition, the sliding contact arms indicated in this Wheatstone bridge circuit may be omitted, and thereby the exact measurement of the true mixed-air temperatures, with a relatively simple circuit arrangement without moving parts to be involved, may be accomplished.

While I have described my invention as embodied in mixed-air temperature measurement circuits, it will be clear that modification and structural details thereof may be resorted to without departing from the spirit of the invention. It will be further evident that although I have disclosed, on a preferred use of my invention, its application to mixed-air temperature measuring, many and diverse modes of utilization thereof may be found.

I, accordingly, desire that my invention shall be restricted in its scope only by the terms and scope of the claims appended hereto. What I claim and desire to secure by Letters Patent of the United States is:

1. An electric measuring device for detecting the variation of the exact average temperature of air mixtures in a mixing compartment having two air supply openings leading thereto, and having means provided in each of said supply duct openings to produce any desired proportion of the volumes of said respective air streams flowing therethrough, including in combination, a Wheatstone bridge circuit with a pair of terminals and having a pair of cooperating temperature responsive resistances of like characteristics in series located within said compartment in proximity of said respective supply openings to be directly exposed to the temperature changes in said air streams and connected in one arm of said bridge circuit; and having means provided on said temperature responsive resistances to adjust the relative proportion of the values of said temperature responsive resistances for a predetermined standard mixed-air temperature to correspond to the relative proportion of the variable volumes of the respective air streams to which they are subjected, and a non-responsive resistance connected in the adjacent arm of said bridge circuit having a resistance value of unit length equivalent to that of unit length of the temperature responsive resistances under standard air temperature condition and having separate means provided to independently adjust the length of said resistance to correspond to the total resultant operating length of both temperature responsive resistances in series, and two other non-responsive fixed resistances of like value each of which is connected in the opposed arms of said bridge circuit, said cooperating temperature responsive resistances in series controlling the unbalance potential on said pair of terminals electrically connected in said bridge circuit in accordance with the change of the average temperature of said air streams, said unbalance potential representing a condition in said bridge circuit when the mixed-air temperature departs from a predetermined standard value, and means connected to said pair of terminals in said bridge circuit affected by changes in said unbalance potential, thereby to obtain an exact measurement of the mixed-air temperature irrespective of the thoroughness of the mixing of both said air streams in said mixing compartment.

2. An electric measuring device for detecting the variation of the exact average temperature of air mixtures, in a mixing compartment having two air supply duct openings leading thereto, and having two cooperating damper system arrangements located, respectively, in said supply duct openings to produce a linear variation of the volume of the respective air streams flowing therethrough, said damper systems operating inversely with respect to each other to produce a total flow through said supply duct openings of constant volume under any position of the cooperating damper systems, including in combination, a Wheatstone bridge circuit with a pair of terminals and having a pair of cooperating temperature responsive resistances of like characteristics in series located within said compartment in proximity of said respective supply duct openings and connected in one arm of said bridge circuit, said temperature responsive resistances being provided with sliding contact arms adjustable along the entire length of said resistance wires to short circuit any portion thereof, and interlocking means mechanically connecting, respectively, said sliding contact arms with said respective cooperating damper systems to operate simultaneously but in opposite direction with respect to each other so as to maintain a constant resultant length of both resistance wires irrespective of the position of the sliding contact arms, the relative proportion of the length of said temperature responsive resistance wires in series being obtained by a corresponding displacement of the cooperating sliding contact arms and in accordance with the relative proportion of the volumes of said air streams under any position of the cooperating damper systems, each of said cooperating temperature responsive resistances being, respectively, directly exposed to the respective air streams so as to respond to the temperature changes in said air streams, a non-responsive fixed resistor connected in the adjacent arm of the bridge having a selected value equivalent to that of the cooperating temperature responsive resistances in series for a predetermined standard mixed-air temperature condition, and two non-responsive fixed resistors of like value each of which is connected in the opposed arms of said bridge circuit, said cooperating temperature responsive resistances in series controlling the unbalance potential on said pair of terminals electrically connected in said bridge circuit in accordance with the average temperature of the respective air streams to which they are subjected, said unbalance potential being developed between said terminals when the mixed-air temperature of said air streams departs from a predetermined standard value, for which said bridge circuit is balnced, caused by a corresponding change of the resultant series resistances of said cooperating resistance elements, and said unbalance potential being phase dependent upon the direction of unbalnce produced by the average temperature variation at the measuring point, and including a device connected to said pair of terminals being operative in response to an unbalance potential between said pair of terminals, thereby to obtain an exact measurement of the mixed-air temperature irrespective of the thoroughness of the mixing of both said air streams in said mixing compartment.

3. The subject matter as defined in claim 2 wherein each of the said inversely operated damper systems comprises two parallel dampers located between two fixed blades for securing the required constant total volume of said air streams to be discharged under any position of the angular run of the respective damper systems.

4. An electric measuring device for detecting the variation of the exact average temperature of air mixtures in a mixing compartment having two air supply duct openings leading thereto, and having two cooperating damper system arrangements located, respectively, in said supply duct openings and exhibiting a non-linear variation of the volume of the respective air streams flowing therethrough, said damper systems being independently adjusted, including in combination, two reversible control motors, a Wheatstone bridge circuit with a pair of terminals and having a pair of cooperating temperature responsive resistances in series located within said compartment in proximity of said respective openings and connected in one arm of the bridge circuit, said temperature responsive resistances being, respectively, provided with sliding contact arms adjustable along the entire length of said resistance wires to short circuit any portion thereof, two non-responsive fixed resistors of equal value having sliding contact arms adjustable along their length and mechanically connected, respectively, with the corresponding sliding contact arms of said cooperating temperature responsive resistances to be positioned simultaneously but being electrically isolated from each other and connected in series, in the adjacent arm of said bridge circuit, means located, respectively, in said respective supply openings responsive to the changes in the volumes of the respective air streams to operate said reversible control motors to adjust respective sliding contact arms to produce a proportionate displacement of the corresponding sliding contact arms of the respective resistance pairs in accordance with the change in the relative proportion of the varying air streams under any position of the cooperating damper systems, and two non-responsive fixed resistors of like value each of which is connected in the opposed arms of said bridge circuit, said cooperating temperature responsive resistances in series controlling the unbalance potential on said pair of terminals electrically connected in said bridge circuit in accordance with the average temperature of the respective air streams to which they are subjected by being directly exposed to the temperature changes in said air streams, said unbalance potential being developed between said pair of terminals when the mixed-air temperature of said air streams departs from a predetermined standard value, for which said bridge is balanced, said unbalance potential being phase dependent upon the direction of unbalance produced by the average temperature variation at the measuring point, and including a device connected to said pair of terminals being operative in response to an unbalance potential between said pair of terminals, thereby to obtain an exact measurement of the mixed-air temperature irrespective of the thoroughness of the mixing of both said air streams in said mixing compartment.

5. The subject matter as defined in claim 4 wherein said damper systems operate inversely with respect to each other to produce a total flow through said supply duct openings of non-constant volume under the different positions of the cooperating damper systems having a non-linear characteristic, and wherein the relative balance of the bridge circuit is secured for a predetermined standard mixed-air temperature condition irrespective of the varying non-constant total volume flow of the respective air streams.

References Cited in the file of this patent
UNITED STATES PATENTS

| | | |
|---|---|---|
| 1,946,155 | Foster | Feb. 6, 1934 |
| 2,246,575 | Coleman | June 24, 1941 |
| 2,282,442 | Whitlock | May 12, 1942 |
| 2,539,089 | Lear | Jan. 23, 1951 |
| 2,603,422 | Sargeaunt | July 15, 1952 |
| 2,694,930 | Lamb et al. | Nov. 23, 1954 |